(12) United States Patent
Kamakura et al.

(10) Patent No.: US 7,328,298 B2
(45) Date of Patent: Feb. 5, 2008

(54) APPARATUS AND METHOD FOR CONTROLLING I/O BETWEEN DIFFERENT INTERFACE STANDARDS AND METHOD OF IDENTIFYING THE APPARATUS

(75) Inventors: Sanae Kamakura, Kawasaki (JP); Sawao Iwatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 427 days.

(21) Appl. No.: 10/218,468

(22) Filed: Aug. 15, 2002

(65) Prior Publication Data

US 2003/0041207 A1 Feb. 27, 2003

Related U.S. Application Data

(63) Continuation of application No. PCT/JP00/01058, filed on Feb. 24, 2000.

(51) Int. Cl.
  *G06F 13/14* (2006.01)
(52) U.S. Cl. ............... 710/305; 710/302; 710/313; 710/316; 710/2
(58) Field of Classification Search ........ 710/8–19, 710/36–38, 62–64, 72, 300–317, 1–3; 711/111–114, 711/149–150, 3, 163, 167; 713/1–2, 100; 714/6–9, 25, 43–44
See application file for complete search history.

(56) References Cited

U.S. PATENT DOCUMENTS

| | | | | |
|---|---|---|---|---|
| 5,790,775 A | * | 8/1998 | Marks et al. | 714/9 |
| 5,822,614 A | * | 10/1998 | Kenton et al. | 710/8 |
| 5,872,524 A | | 2/1999 | Iida | |
| 5,894,481 A | * | 4/1999 | Book | 370/412 |
| 5,944,794 A | * | 8/1999 | Okamoto et al. | 709/225 |
| 5,954,796 A | * | 9/1999 | McCarty et al. | 709/222 |
| 5,974,474 A | * | 10/1999 | Furner et al. | 710/8 |
| 6,009,479 A | * | 12/1999 | Jeffries | 710/8 |
| 6,009,535 A | * | 12/1999 | Halligan et al. | 714/5 |
| 6,098,116 A | * | 8/2000 | Nixon et al. | 710/8 |
| 6,148,349 A | * | 11/2000 | Chow et al. | 710/33 |
| 6,157,962 A | * | 12/2000 | Hodges et al. | 710/1 |
| 6,209,023 B1 | * | 3/2001 | Dimitroff et al. | 709/211 |

(Continued)

FOREIGN PATENT DOCUMENTS

EP 0 772 134 A1 5/1997

(Continued)

OTHER PUBLICATIONS

Japanese Patent Office Action mailed Aug. 7, 2007 in corresponding Japanese Patent Application No. 2001-562318.

(Continued)

*Primary Examiner*—Raymond N Phan
(74) *Attorney, Agent, or Firm*—Staas & Halsey LLP

(57) ABSTRACT

According to the present invention, an input/output controller connected between an interface connection port of an information processing apparatus and a network device so as to connect the information processing apparatus and a network includes an identification number obtaining part obtaining an identification number unique to the network device, a port number obtaining part obtaining a port number from the interface connection port of the information processing apparatus, and an identification information generation part generating identification information on the network from the identification number and the port number.

10 Claims, 10 Drawing Sheets

U.S. PATENT DOCUMENTS

| | | | |
|---|---|---|---|
| 6,240,511 B1 * | 5/2001 | Blumenau et al. | 713/1 |
| 6,260,120 B1 * | 7/2001 | Blumenau et al. | 711/152 |
| 6,263,387 B1 * | 7/2001 | Chrabaszcz | 710/303 |
| 6,266,740 B1 * | 7/2001 | Don et al. | 711/114 |
| 6,336,152 B1 * | 1/2002 | Richman et al. | 710/8 |
| 6,343,324 B1 * | 1/2002 | Hubis et al. | 709/229 |
| 6,366,964 B1 * | 4/2002 | Shima et al. | 710/8 |
| 6,430,645 B1 * | 8/2002 | Basham | 710/305 |
| 6,484,245 B1 * | 11/2002 | Sanada et al. | 711/164 |
| 6,571,354 B1 * | 5/2003 | Parks et al. | 714/7 |
| 6,609,165 B1 * | 8/2003 | Frazier | 710/36 |
| 6,631,442 B1 * | 10/2003 | Blumenau | 711/112 |
| 6,665,714 B1 * | 12/2003 | Blumenau et al. | 709/222 |
| 6,725,394 B1 * | 4/2004 | Bolt | 714/7 |
| 6,735,715 B1 * | 5/2004 | Graham | 714/9 |
| 6,779,064 B2 * | 8/2004 | McGowen et al. | 710/104 |
| 6,792,479 B2 * | 9/2004 | Allen et al. | 710/10 |

FOREIGN PATENT DOCUMENTS

| | | |
|---|---|---|
| EP | 0 917 319 A2 | 5/1999 |
| JP | 8-316975 | 11/1996 |
| JP | 9-146875 | 6/1997 |
| JP | 11-088434 | 3/1999 |
| JP | 11-252181 | 9/1999 |
| JP | 11282767 | 10/1999 |
| WO | 99/34297 | 7/1999 |

OTHER PUBLICATIONS

English-language translation of International Search Report (Form PCT/ISA/210 (second sheet)) for International Application No. PCT/JP00/01058, having a mailing date of Jun. 6, 2000.

English-language translation of PCT International Preliminary Examination Report for International Application No. PCT/JP00/01058, mailed Mar. 28, 2002 as indicated in the PCT Notification of Transmittal of Copies of Translation of the International Preliminary Examination Report.

Office Action mailed Sep. 12, 2006 in the corresponding Japanese patent application No. 2001-562318.

* cited by examiner

FIG.7

| BYTE | 0 | | 1 | 2 3 4 | 5 | 6 7 |
|---|---|---|---|---|---|---|
| BIT | 63-60 | 59-56 | 55-48 | 47-24 | 23-16 | 15-0 |
| PORT NAME | NAA | VENDER SPECIFIED | | COMPANY ID | COMPANY ASSIGNED VALUE | |
| | 02h | PORT NO. | DEVICE TYPE | xxxxxx h | MODEL ID | PRODUCTION SERIAL NUMBER |

FIG.8A

| BIT | 3 | 2 | 1 | 0 |
|---|---|---|---|---|
|  | TARGET ID ||||

FIG.8B

| BIT | 3 | 2 | 1 | 0 |
|---|---|---|---|---|
|  | SCSI LUN ||||

FIG.8C

| BIT | 7 | 6 | 5 | 4 | 3 | 2 | 1 | 0 |
|---|---|---|---|---|---|---|---|---|
|  | TARGET ID |||| SCSI LUN ||||

APPARATUS AND METHOD FOR CONTROLLING I/O BETWEEN DIFFERENT INTERFACE STANDARDS AND METHOD OF IDENTIFYING THE APPARATUS

This is a continuing application, filed under 35 U.S.C. § 111(a), of International Application PCT/JP00/01058, filed Feb. 24, 2000.

TECHNICAL FIELD

The present invention generally relates to input/output controllers, device identification methods, and input/output control methods, and more particularly to an input/output controller, a device identification method, and an input/output control method that allow hot plugging of information processing devices.

Recently, fiber channel has come to the front as a next-generation interface standard to SCSI (Small Computer System Interface).

As the capacity of an individual storage system has increased, a function that allows the storage system to be used by a plurality of servers is required.

Fiber-channel interfaces, which realize high-speed data transfer, have been widely used, so that it is required to make the fiber-channel interfaces usable with SCSI interfaces.

BACKGROUND ART

The conventional SCSI interface employs a device type code and a serial number to manage a device.

On the other hand, the fiber channel standard requires that a device be managed with a world wide name (WWN). The WWN, which has a data length of eight bytes, is required to be set to a value unique to the port to which the device is connected. Since the device type code and the serial number employed in the conventional SCSI interface do not serve as a value unique to the port, the WWN is required to be newly set.

Further, in the case of using the SCSI interface, a target ID and a logical unit number are specified when the device is accessed. On the other hand, the fiber-channel standard provides that only the logical unit number of the device be specified. That is, in the case of using the fiber-channel interface, each device is required to be assigned a different logical unit number.

Furthermore, the SCSI standard defines a logical unit number "0" as an essential device. Therefore, replacement of a device having the logical unit number "0" makes all the connected devices unusable.

DISCLOSURE OF THE INVENTION

An object of the present invention is to eliminate the above-described disadvantages, and is achieved by the following aspects of the present invention.

According to the present invention, identification information on an interface is generated from an identification number unique to an interface control device and a port number of a connection port of the interface.

According to the present invention, a device is accessed through a fiber-channel interface with an identifier that is the combination of a device identifier and a logic unit number assigned to the device on a SCSI interface.

According to the present invention, a WWN can be set fixed to a port so that the same WWN can be regenerated even if a channel adapter (input/output controller) connected to the port is replaced. Accordingly, a device connected to the replacing channel adapter is prevented from being recognized as a different device after the channel adapter is replaced. This allows hot plugging of the device. Further, no setting change is required on the host computer side at the time of maintenance.

According to the present invention, when a device of a reference logic unit number is removed, a given response as made by the device of the reference logic unit number continues to be made.

Therefore, even if the device of the reference logic unit number is removed, a normal operation can be performed since the given response as made by the device of the reference logic unit number continues to be made.

BRIEF DESCRIPTION OF THE DRAWINGS

FIG. 7 is a diagram showing a data configuration of the WWN of the embodiment of the present invention;

FIGS. 8A through 8C are diagrams for illustrating a relationship between a fiber-channel logic unit number and a SCSI logic unit number of the embodiment of the present invention;

BEST MODE FOR CARRYING OUT THE INVENTION

Figure 1:
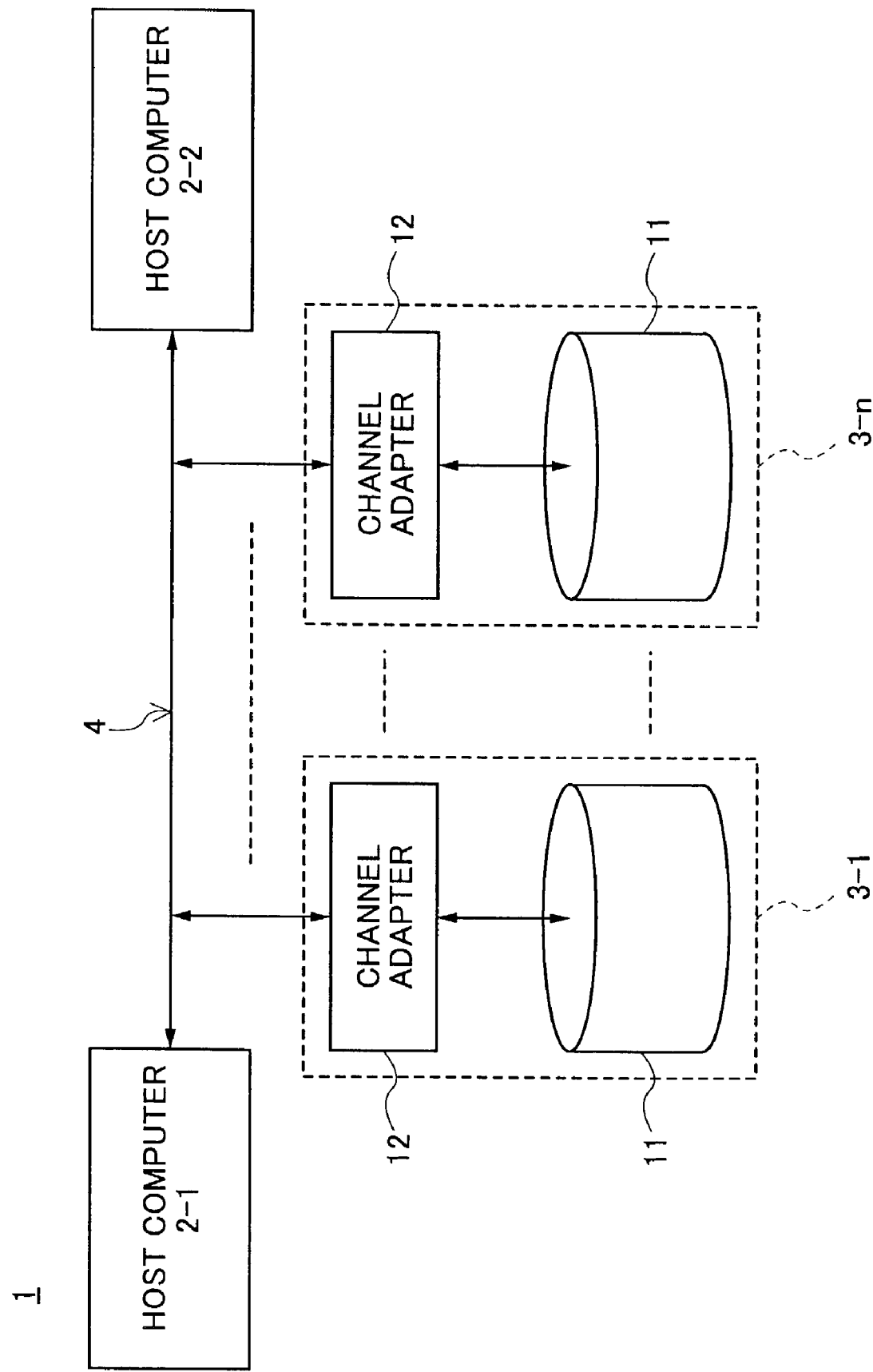
FIG. 1 is a block diagram showing an embodiment of the present invention.

FIG. 1 is a block diagram showing an embodiment of the present invention.

A system 1 of this embodiment is formed by connecting host computers 2-1 and 2-2 with storage systems 3-1 through 3-n by an interface 4.

The host computers 2-1 and 2-2 share the storage systems 3-1 through 3-n. Each of the storage systems 3-1 through 3-n is composed of a storage device 11 and a channel adapter 12 (input/output controller) in FIG. 1, but may include more than one storage device 11 and more than one channel adapter 12.

The storage device 11, which is composed of, for instance, a hard disk drive, stores data. The channel adapter 12 connects the storage device 11 to the interface 4.

The interface 4 is a fiber-channel interface, which is a high-speed serial interface identifying a device by its WWN.

Next, a detailed description will be given of the channel adapter 12 of this embodiment.

Figure 2:
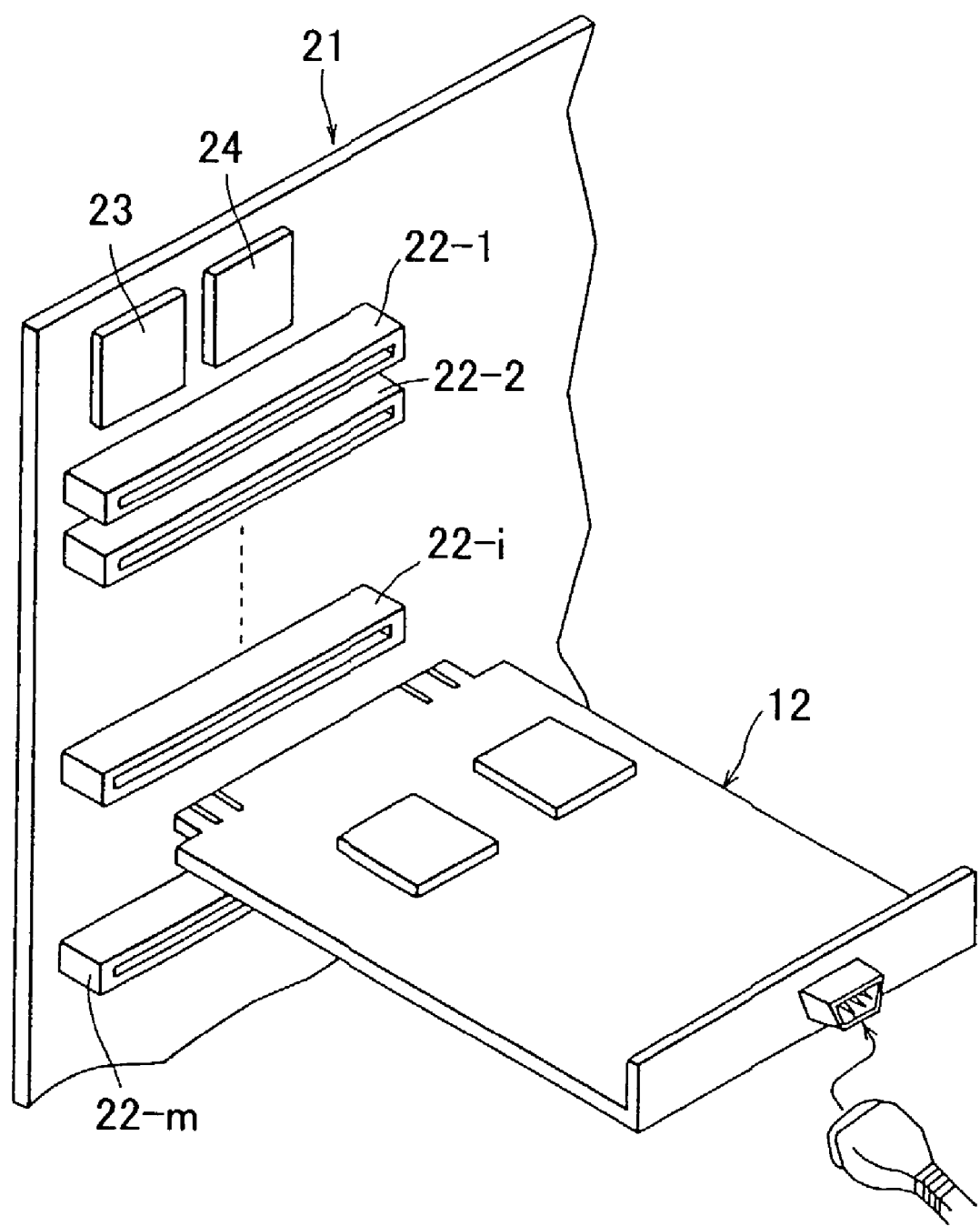
FIG. 2 is a diagram showing a configuration of a connection part of a channel adapter of the embodiment of the present invention.

FIG. 2 is a diagram showing a configuration of a connection part of the channel adapter 12 of this embodiment. In FIG. 2, a plurality of SCSI ports 22-1 through 22-m, a ROM 23, and a controller 24 are mounted on an interface board 21 of the storage device 11. The interface board 21 may be included in each of the host computers 2-1 and 2-2. A port number is assigned to each of the SCSI ports 22-1 through 22-m beforehand. The port numbers are stored in the ROM 23 provided to the interface board 21, and are read from the ROM 23 by the controller 24.

The channel adapter 12 is connected to one of the SCSI ports 22-1 through 22-m, for instance, the SCSI port 22-i. When the power is turned on, the channel adapter 12 makes a request to the interface board 21 for the port number of the SCSI port 22-i. The request is provided to the controller 24 of the interface board 21. The controller 24 reads out the port number corresponding to the SCSI port 22-i from the ROM 23, and supplies the port number to the channel adapter 12.

The channel adapter 12 stores a device type, a company ID, a model ID, and a serial number, and generates a WWN from the device type, the company ID, the model ID, the serial number, and the port number of the SCSI port 22-i.

Figure 3:
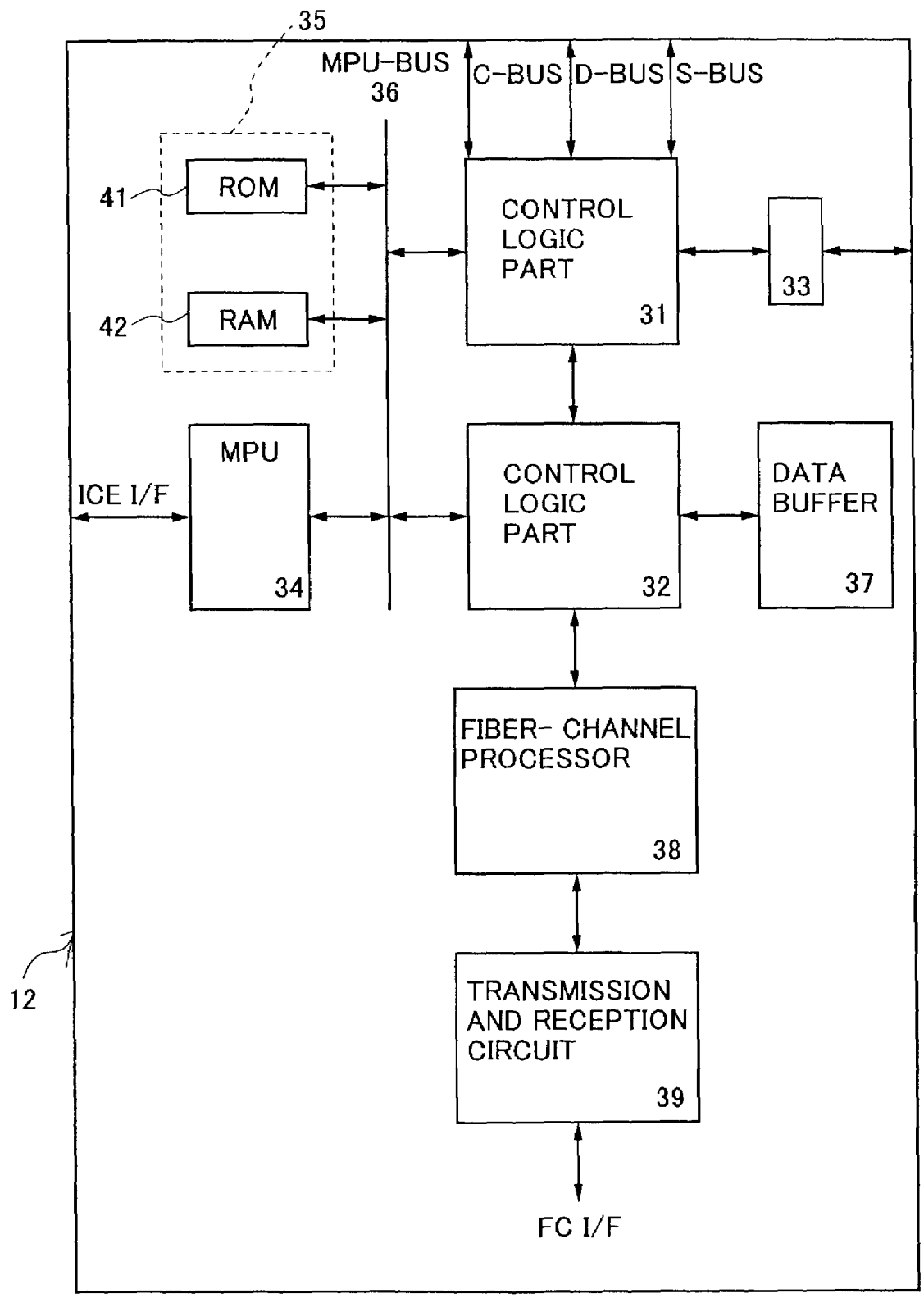
FIG. 3 is a block diagram showing the channel adapter of the embodiment of the present invention.

FIG. 3 is a block diagram showing the channel adapter 12 of this embodiment.

The channel adapter 12 includes control logic parts 31 and 32, a driver 33, a microprocessor unit (MPU) 34, a memory 35, an MPU bus 36, a data buffer 37, a fiber-channel processor 38, and a transmission and reception circuit 39.

The control logic part 31 controls communication with the storage device 11. The control logic part 32 controls writing data to and reading data from the data buffer 37.

The driver 33 transmits data to and receives data from an RS-232C interface, which is used as a debugger interface.

The MPU 34 performs processing including generation of the WWN. The memory 35 is composed of a ROM 41 and a RAM 42. The ROM 41 stores a program for generating the WWN, the device type, the company ID, the model ID, and the serial number. The RAM 42 is used as a working storage for the MPU 34.

The MPU bus 36 connects the control logic parts 31 and 32, the MPU 34, and the memory 35. The data buffer 37 temporarily stores data supplied from the storage device 11 and the fiber-channel interface 4.

The fiber-channel processor 38 performs data conversion. The transmission and reception circuit 39 receives data from and transmits data to the fiber-channel interface 4.

Next, a detailed description will be given of generation of the WWN by the MPU 34.

Figure 4:
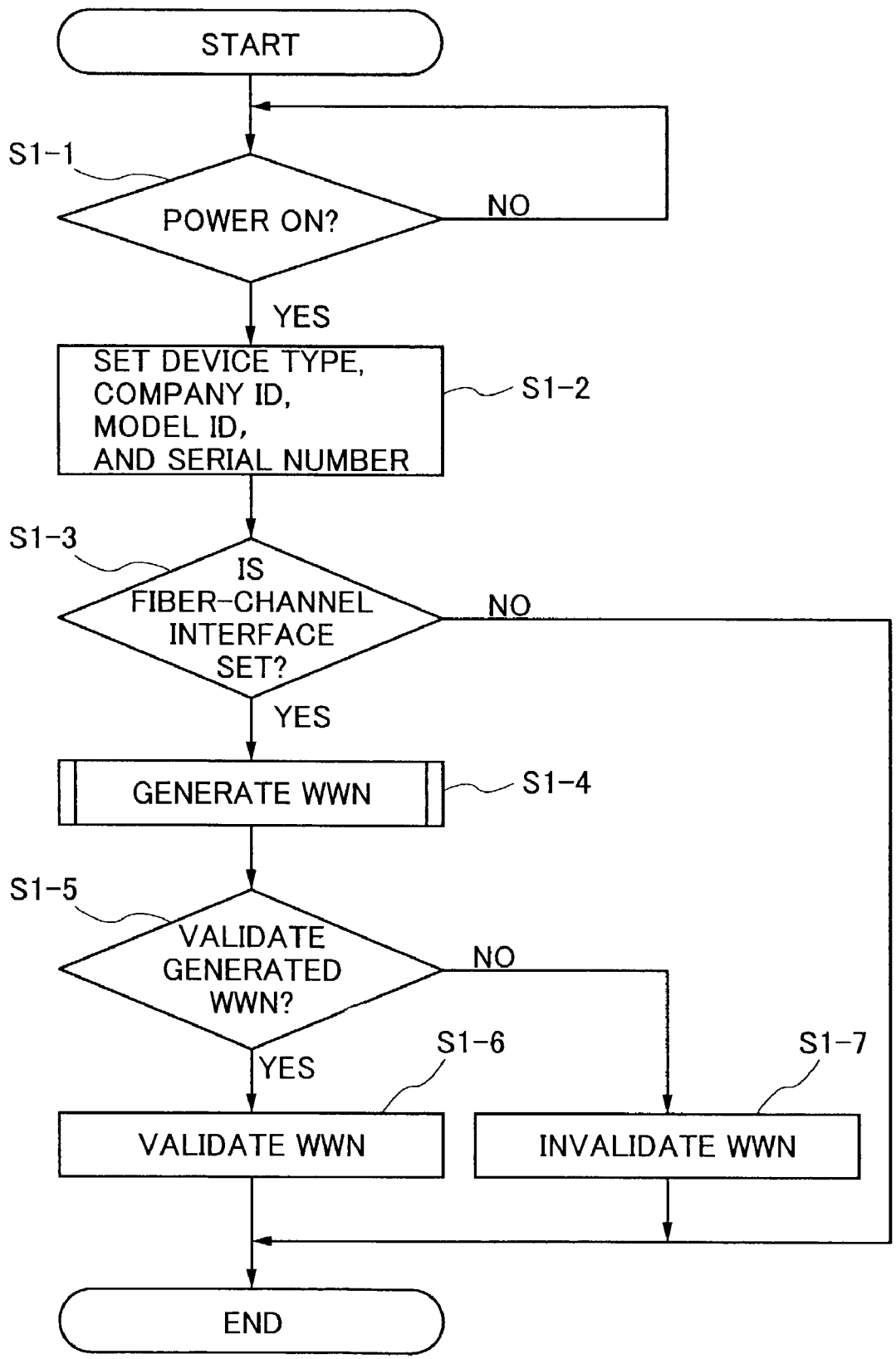
FIG. 4 is a flowchart of WWN generation of the embodiment of the present invention.

FIG. 4 is a flowchart of generation of the WWN by the MPU 34.

Generation of the WWN by the MPU 34 includes steps S1-1 through S1-7.

In step S1-1, it is determined whether the channel adapter 12 is turned on. If it is determined in step S1-1 that the channel adapter 12 is turned on, in step S1-2, the device type, the company ID, the model ID, and the serial number are read from the ROM 41, and are set in the RAM 42. When the device type, the company ID, the model ID, and the serial number are set in the RAM 42, in step S1-3, it is determined whether the fiber-channel interface 4 is set as the interface to be used. If it is determined in step S1-3 that the fiber-channel interface 4 is set as the interface to be used, in step S1-4, the WWN is generated. A detailed description will be given later of the operation of step S1-4. When the WWN is generated in step S1-4, in step S1-5, it is determined whether the WWN generated in step S1-4 is to be validated.

If it is determined in step S1-5 that the WWN generated is to be validated, in step S1-6, the WWN is validated. If it is determined in step S1-5 that the WWN generated is not to be validated, or is to be invalidated, in step S1-7, the WWN is invalidated.

Thereby, the WWN is set in the channel adapter 12 so that communication can be performed through the fiber-channel interface 4.

Next, a detailed description will be given of the operation of step S1-4.

Figure 5:
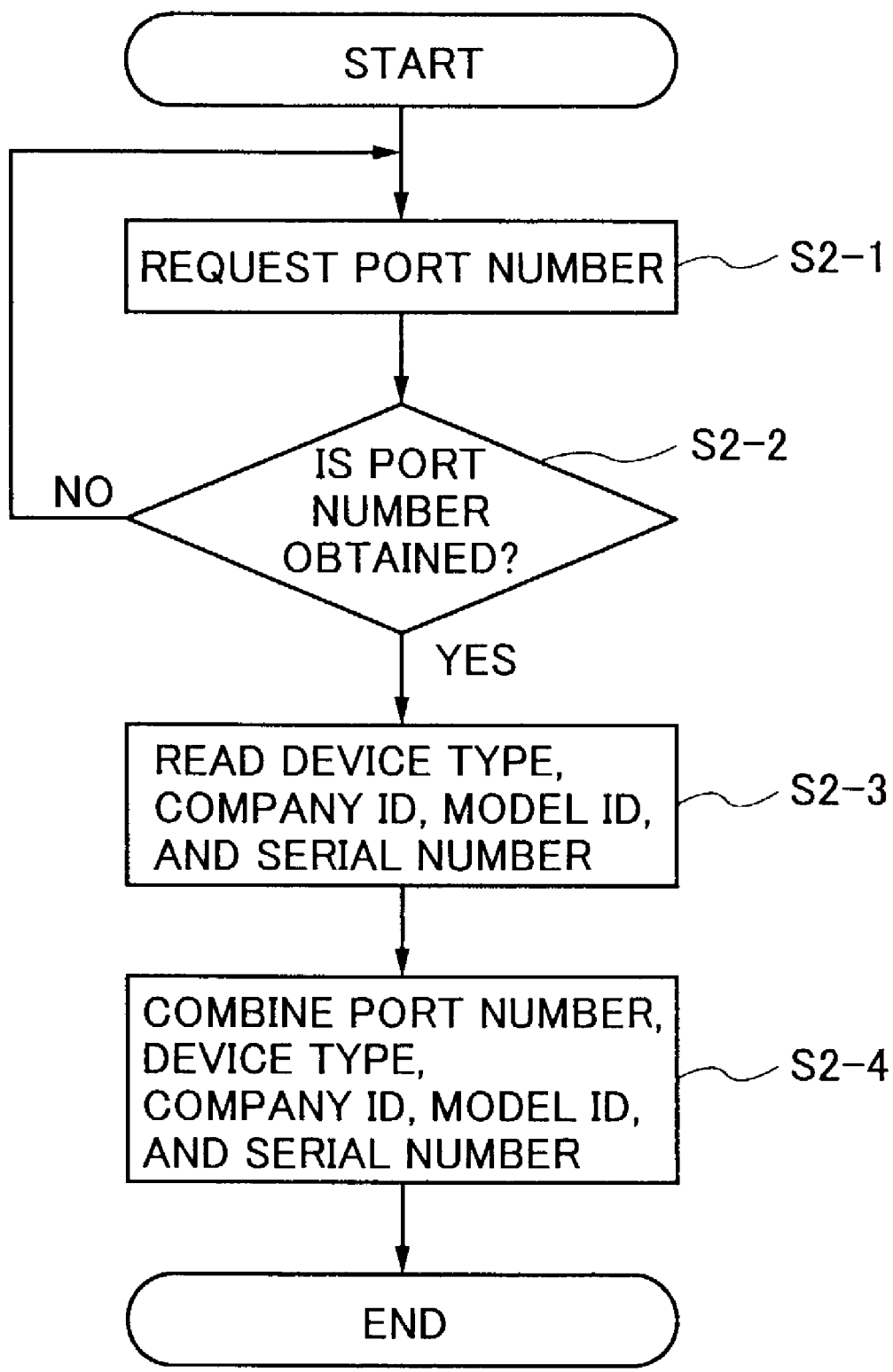
FIG. 5 is a flowchart of the WWN generation of the embodiment of the present invention.

FIG. 5 is a flowchart of the operation of step S1-4. The operation of step S1-4 includes steps S2-1 through S2-4.

In step S2-1, a request is made to the SCSI port 22-i for its port number. Next, in step S2-2, it is determined whether the port number of the SCSI port 22-i is obtained.

If it is determined in step S2-2 that the port number of the SCSI port 22-i is obtained, in step S2-3, the device type, the company ID, the model ID, and the serial number are read from the RAM 42.

Next, in step S2-4, the WWN is generated by combining the port number, the device type, the company ID, the model ID, and the serial number.

Figure 6:
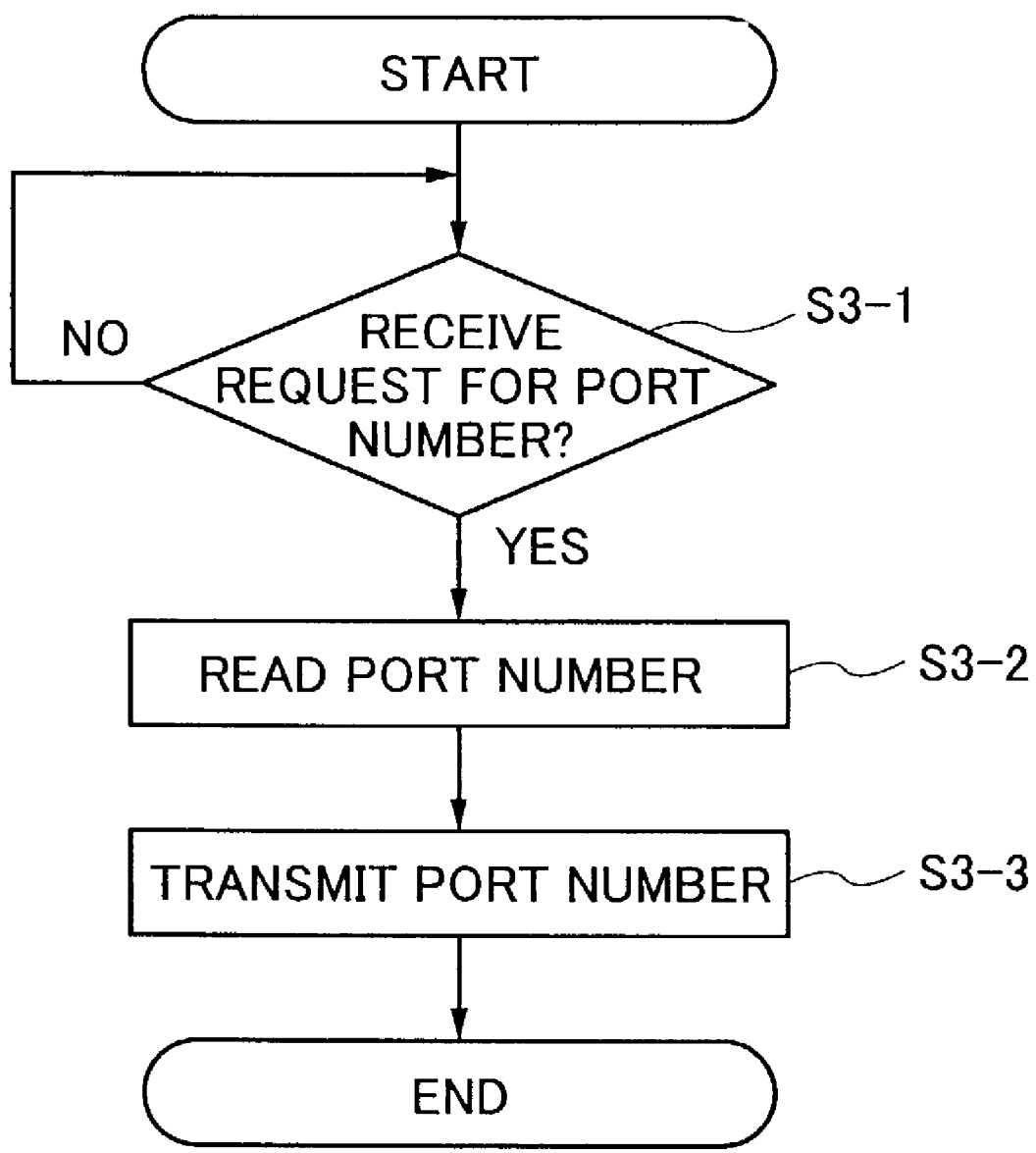
FIG. 6 is a flowchart of an operation of a controller of the embodiment of the present invention.

Here, a description will be given, with reference to the flowchart of FIG. 6, of an operation of the controller 24 of the interface board 21 according to this embodiment.

The controller 24 of the interface board 21 executes steps S3-1 through S3-3 at the request of the channel adapter 12.

In step S3-1, it is determined whether the controller 24 has received the request for the port number of the SCSI port 22-i from the channel adapter 12. If it is determined in step S3-1 that the controller 24 has received the request, in step S3-2, the controller 24 reads the requested port number of the SCSI port 22-i from the ROM 23. Next, in step S3-3, the controller 24 transmits the read-out port number to the SCSI port 22-i.

Thereby, the port number corresponding to the SCSI port 22-i to which the channel adapter 12 is attached is supplied to the channel adapter 12.

Next, a detailed description will be given of a configuration of the WWN generated in the operation of FIG. 5.

FIG. 7 is a diagram showing a data configuration of the WWN of this embodiment.

An ANSI (American National Standards Institute) standard provides that the WWN have an eight-byte/64-bit length.

As shown in FIG. 7, the port number corresponding to the SCSI port 22-i is read from the interface board 21 to be set in the $59^{th}$ to $56^{th}$ bits. The device type read from the ROM 41 is set in the $55^{th}$ to $48^{th}$ bits. The company ID is set in the $47^{th}$ to $24^{th}$ bits. The model ID is set in the $23^{rd}$ to $16^{th}$ bits. The (production) serial number is set in the $15^{th}$ to $0^{th}$ bits. The $63^{rd}$ to $60^{th}$ bits are set to a fixed value.

Thus, the WWN is automatically generated. Accordingly, the WWN is prevented from being set to a wrong value. Since the device type, the company IS, the model ID, and the serial number are preset in the device, there is no need for newly assigning a WWN to the device.

Next, a description will be given of a method of using a storage device with both a SCSI interface and a fiber-channel interface.

In order to use a storage device with both types of interfaces, a fiber-channel logic unit number FCLUN specified by the fiber-channel interface is the combination of a target ID and a SCSI logic unit number SCSILUN in this embodiment.

FIGS. 8A through 8C are diagrams for illustrating a relationship between the fiber-channel logic unit number FCLUN and the SCSI logic unit number SCSILUN according to this embodiment. FIG. 8A shows a data configuration of the target ID, FIG. 8B shows a data configuration of the SCSI logic unit number SCSILUN, and FIG. 8C shows a data configuration of the fiber-channel logic unit number FCLUN.

The channel adapter 12 manages the target ID shown in FIG. 8A and the SCSI logic unit number SCSILUN shown in FIG. 8B. In the case of employing the fiber-channel interface, the target ID shown in FIG. 8A and the SCSI logic unit number SCSILUN shown in FIG. 8B are combined so that the fiber-channel logic unit number FCLUN of one byte shown in FIG. 8C is generated. The fiber-channel logic unit number FCLUN differs in value for each logic unit.

By thus forming the fiber-channel logic unit number FCLUN by combining the target ID and the SCSI logic unit number SCSILUN, a region specified through the SCSI interface can be accessed through the fiber-channel interface and a region can be accessed from a plurality of ports through the fiber-channel interface by using the same target ID to form the fiber-channel logic unit number FCLUN. Further, in the case of using the fiber-channel interface independently, access control can be performed by forming the fiber-channel logic unit number FCLUN using a dummy target ID.

Next, a description will be given of a method of preventing any connected device from being unrecognized when no device of the logic unit number (LUN) "0" (LUN=0) exists.

In order to avoid a situation that no connected devices are recognized when no device of LUN=0 exists, a pseudo LUN-0 mode is set in the channel adapter 12 in this embodiment.

Figure 9:
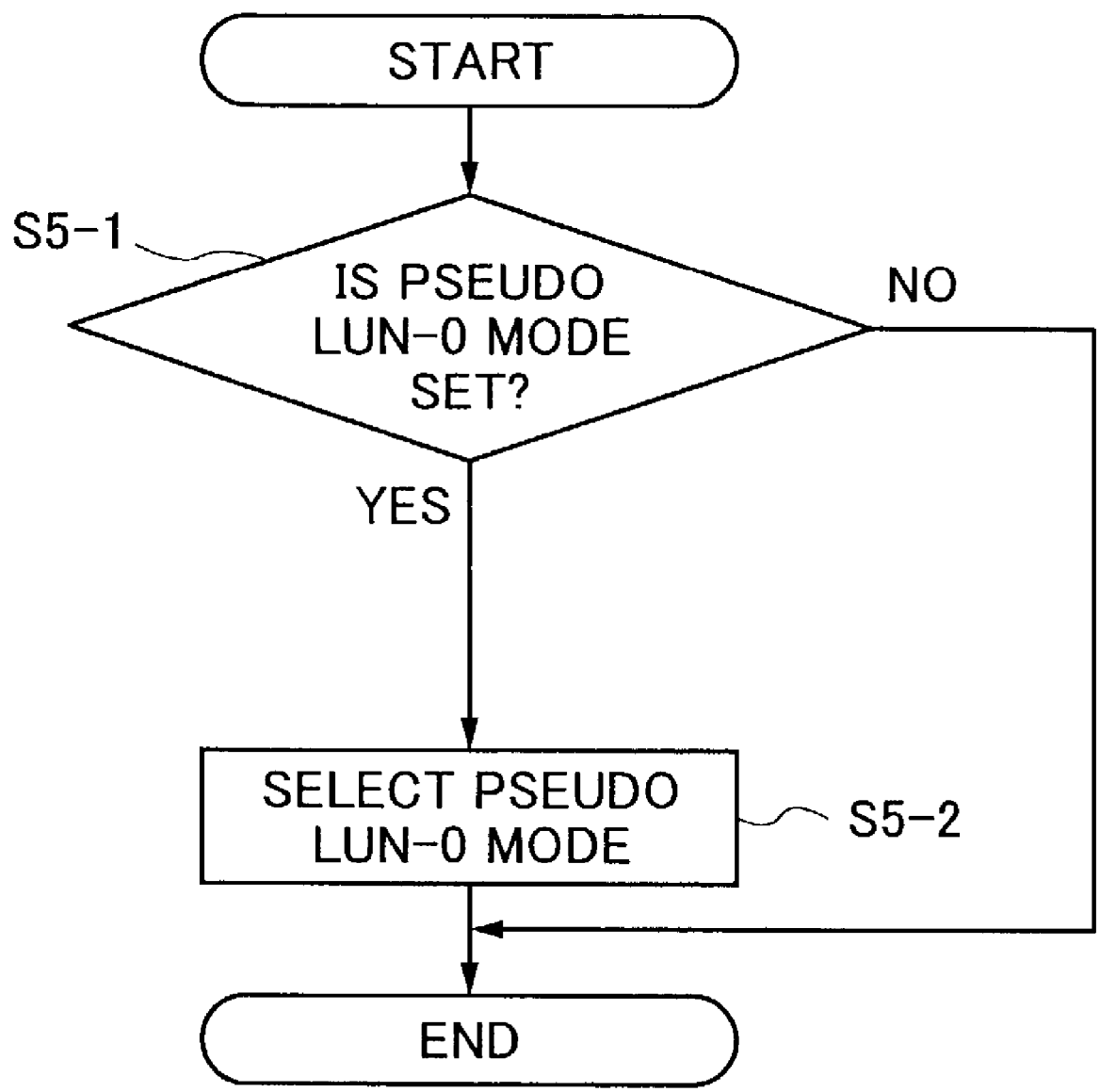
FIG. 9 is a flowchart of an operation of setting a pseudo LUN-0 mode in the channel adapter of the embodiment of the present invention.

First, a description will be given, with reference to the flowchart of FIG. 9, of an operation of setting the pseudo LUN-0 mode in the channel adapter 12 of this embodiment.

The operation of setting the pseudo LUN-0 mode includes steps S5-1 and S5-2.

In step S5-1, it is determined whether the pseudo LUN-0 mode is set by a maintenance manager.

If it is determined in step S5-1 that the pseudo LUN-0 mode is set by the maintenance manager, in step S5-2, the channel adapter 12 is switched to the pseudo LUN-0 mode.

If it is determined in step S5-1 that the pseudo LUN-0 mode is not set by the maintenance manager, a normal response is made.

Thus, the maintenance manager can handle a failure of the device of LUN=0 by setting the pseudo LUN-0 mode in the channel adapter 12.

Figure 10:
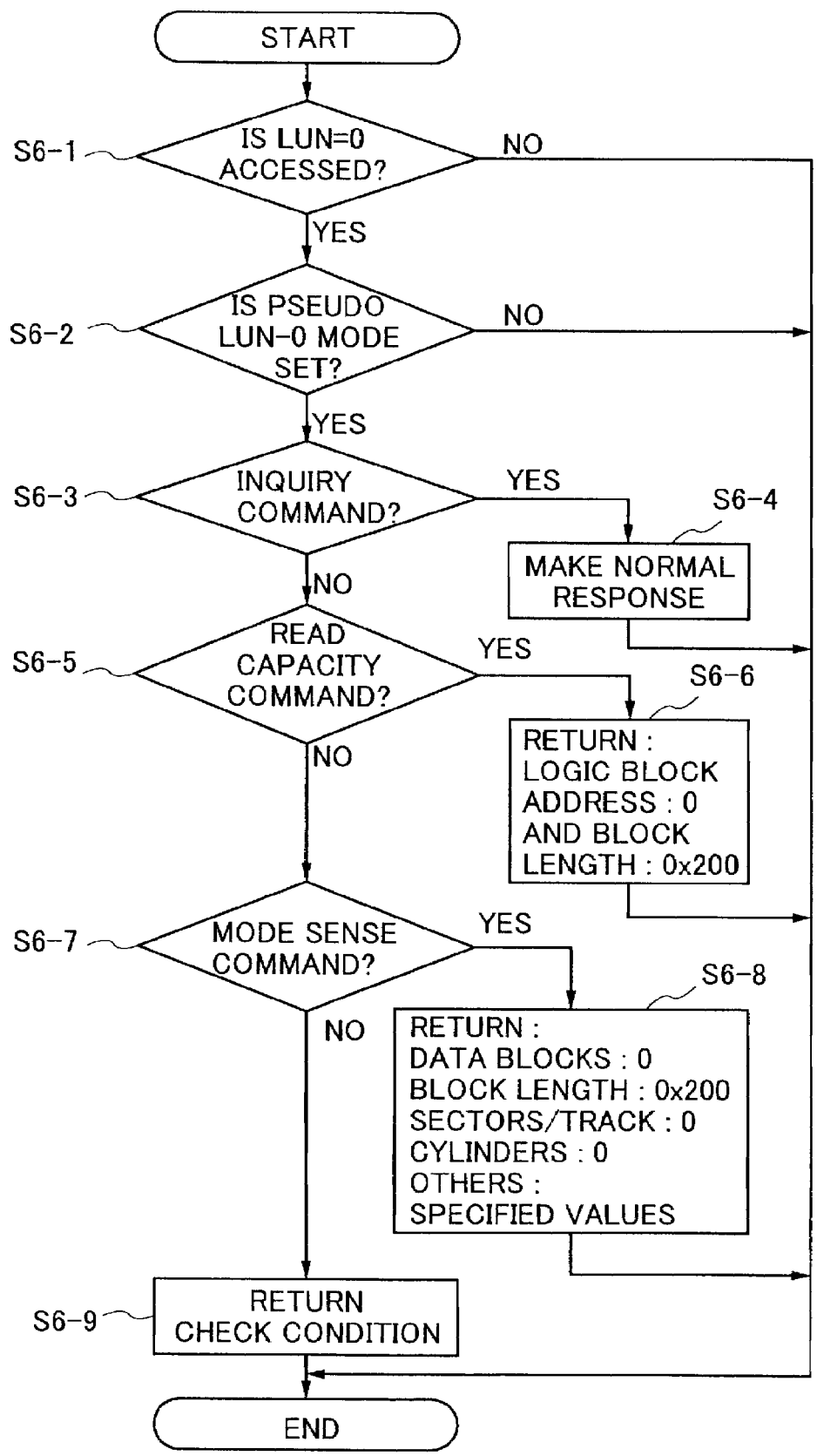
FIG. 10 is a flowchart of an operation of the channel adapter in the pseudo LUN-0 mode of the embodiment of the present invention.

Next, a detailed description will be given, with reference to the flowchart of FIG. 10, of an operation of the channel adapter 12 in the pseudo LUN-0 mode.

The operation of the channel adapter 12 in the pseudo LUN-0 mode includes steps S6-1 through S6-9.

In step S6-1, it is determined whether a device of LUN=0 is accessed. If it is determined in step S6-1 that the device of LUN=0 is not accessed, or that a device other than the device of LUN-0 is accessed, the operation ends.

If it is determined in step S6-1 that the device of LUN=0 is accessed, in step S6-2, it is determined whether the pseudo LUN-0 mode is set.

If it is determined in step S6-2 that the pseudo LUN-0 mode is not set, the operation ends. If it is determined in step S6-2 that the pseudo LUN-0 mode is set, in step S6-3, it is determined whether a command issued to the channel adapter 12 is an inquiry command.

If it is determined in step S6-3 that the command issued to the channel adapter 12 is an inquiry command, in step S6-4, a normal response is made. In step S6-3, only standard inquiry data is supported as the inquiry command. Information indicating as a peripheral qualifier that the logic unit numbers are configured is returned in response to the inquiry command.

If it is determined in step S6-3 that the command issued to the channel adapter 12 is not an inquiry command, in step S6-5, it is determined whether the command is a read capacity command.

If it is determined in step S6-5 that the command is a read capacity command, in step S6-6, a logic block address of "0" and a block length of "0×200" are returned as data. The returned block length "0×200" is a length of data that is supposed to be transferred normally if the device of LUN=0 exists.

If it is determined in step S6-5 that the command is not a read capacity command, in step S6-7, it is determined whether the command is a mode sense command.

If it is determined in step S6-7 that the command is a mode sense command, in step S6-8, the following data are returned in response to the command:
Data blocks: 0
Block length: a predetermined value
Sectors/track: 0
Cylinders: 0
Other regions: values set when normally transferred.

If it is determined in step S6-7 that the command is not a mode sense command, or that the command is other than a mode sense command, in step S6-9, a preset check condition is returned in response to the command.

If the device whose LUN or fiber-channel address is zero exists, the channel adapter 12 may be switched to the pseudo LUN-0 mode.

At this point, when the device of LUN=0 is accessed, a normal operation is performed on the device, while the above-described operation is performed when a failure prevents the device from being accessed.

Thus, according to this embodiment, a device can be accessed through the fiber-channel interface with the identifiers employed in accessing the device through the SCSI interface.

Further, since a WWN can be set fixed to a port, the same WWN can be regenerated even if the channel adapter (input/output controller) connected to the port is replaced. Therefore, a device connected to the replacing channel adapter is prevented from being recognized as a different device on the interface, or on the network, after the channel adapter is replaced. This allows hot plugging of the device.

Furthermore, no setting change is required on the host computer side at the time of maintenance.

Thus, hot-plugging of devices is performable.

The invention claimed is:

1. An input/output controller connected between an interface connection port of an information processing apparatus according to a first interface standard and an interface according to a second interface standard different from the first interface standard on a network, the input/output controller comprising:
   an identification number obtaining part configured to obtain an identification number unique to the information processing apparatus;
   a port number obtaining part configured to obtain a port number from the interface connection port of the information processing apparatus; and
   an identification information generation part configured to automatically generate identification information on the network from the identification number and the port number.

2. A method of identifying an input/output controller connected between an interface connection port of an information processing apparatus according to a first interface standard and an interface according to a second interface standard different from the first interface standard on a network, wherein:
an identification number identifying the information processing apparatus and a port number identifying the interface connection port are obtained;
identification information on the network is automatically generated from the identification number and the port number; and
the input/output controller is identified based on the identification information.

3. An input/output controller having a plurality of connection ports according to a first interface standard for connection with a network, the input/output controller comprising:
a port number storage part configured to store port numbers identifying the connection ports; and
a port number transfer part configured to supply an information processing apparatus connected to one of the connection ports with the port number of the one of the connection ports stored in said port number storage part at a request of the information processing apparatus, the information processing apparatus being connected to an interface according to a second interface standard different from the first interface standard.

4. An input/output controller comprising:
a first input/output control part,
the first input/output control part comprising:
a plurality of connection ports according to a first interface standard; and
a port number storage part configured to store port numbers identifying the connection ports; and
a second input/output control part connected between one of said connection ports of said first input/output control part and an interface according to a second interface standard different from the first interface standard on a network, the second input/output control part being configured to obtain the port number of the one of said connection ports to which the second input/output control part is connected, obtain an identification number unique to the first input/output control part, automatically generate identification information on the network from the port number and the identification number, and perform communications via the network based on the identification information.

5. An input/output controller performing access control based on a reference one of logic unit numbers, the input/output controller comprising:
a detection part configured to detect access to a device associated with the reference logic unit number when the device is prevented from operating normally or is disconnected; and
a response part configured to make a normal response when said detection part detects the access to the device, allowing subsequent logic unit number recognition.

6. An input/output control method of controlling access to a device based on a reference one of logic unit numbers, wherein:
a normal response is made when access to the device associated with the reference logic unit number is detected when the device of the reference logic unit number is prevented from operating normally or is disconnected, allowing subsequent logic unit number recognition.

7. An input/output controller connected between an interface connection port of an interface unit according to SCSI and an interface to an information processing apparatus according to fiber channel on a network, the input/output controller comprising:
an identification number obtaining part configured to obtain an identification number unique to the interface unit;
a port number obtaining part configured to obtain a port number of the interface connection port of the interface unit; and
an identification information generation part configured to automatically generate identification information on the network from the identification number and the port number.

8. A method of identifying an input/output controller connected between an interface connection port of an interface unit according to SCSI and an interface according to fiber channel on a network, the method comprising the steps of:
(a) obtaining an identification number identifying the interface unit and a port number identifying the connection port;
(b) automatically generating identification information on the network from the identification number and the port number; and
(c) identifying the input/output controller based on the identification information.

9. An input/output controller having a plurality of connection ports according to SCSI for connection with a network, the input/output controller comprising:
a pod number storing part configured to store port numbers identifying the connection pods; and
a pod number transfer part configured to supply, at a request of a device connected to one of the connection ports, the port number of the one of the connection pods from said port number storing part to the device, the device being connected to an interface according to fiber channel.

10. An input/output controller comprising:
a first control part,
the first control part comprising:
a plurality of connection ports according to SCSI; and
a port number storage part configured to store port numbers identifying the connection ports; and
a second control part connected between one of said connection ports of said first control part and an interface according to fiber channel on a network,
the second control part comprising:
an identification number obtaining part configured to obtain an identification number unique to said first control part;
a port number obtaining part configured to obtain the port number of the one of said connection ports to which said second control part is connected;
an identification information generation pad configured to automatically generate identification information on the network from the obtained identification number and port number; and
a communication part configured to perform communications via the network based on the identification information.

* * * * *

UNITED STATES PATENT AND TRADEMARK OFFICE
CERTIFICATE OF CORRECTION

| | | |
|---|---|---|
| PATENT NO. | : 7,328,298 B2 | Page 1 of 1 |
| APPLICATION NO. | : 10/218468 | |
| DATED | : February 5, 2008 | |
| INVENTOR(S) | : Sanae Kamakura et al. | |

It is certified that error appears in the above-identified patent and that said Letters Patent is hereby corrected as shown below:

Column 8, Line 35, change "pod" to --port--.

Column 8, Line 36, change "pods;" to --ports;--.

Column 8, Line 37, change "pod" to --port--.

Column 8, Line 39, change "pods" to --ports--.

Column 8, line 59, change "pad" to --part--.

Signed and Sealed this

Twenty-ninth Day of July, 2008

JON W. DUDAS
*Director of the United States Patent and Trademark Office*